ROBBINS & BURLINGAME.
Corn Sheller.
No. 34,846.
Patented April 1, 1862.
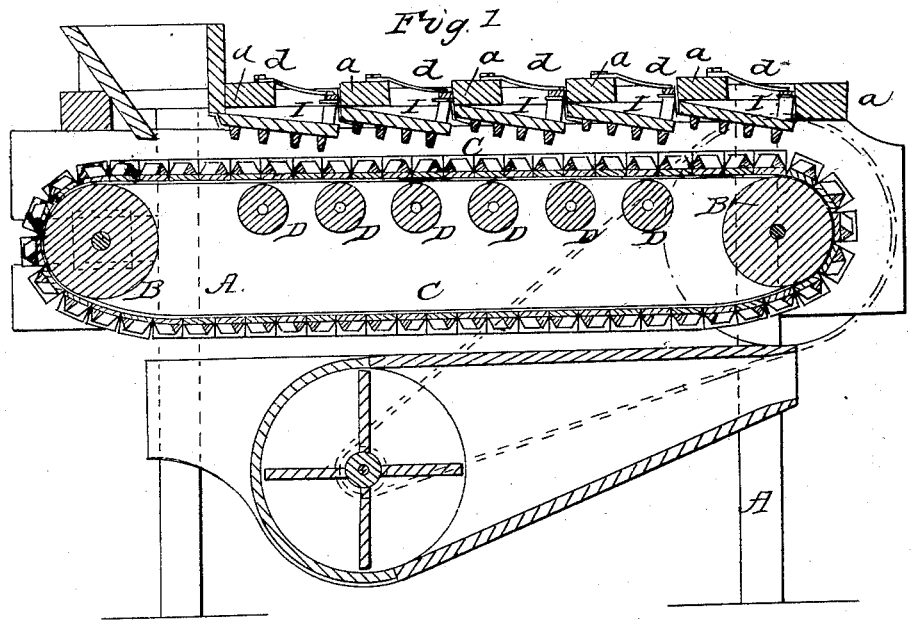
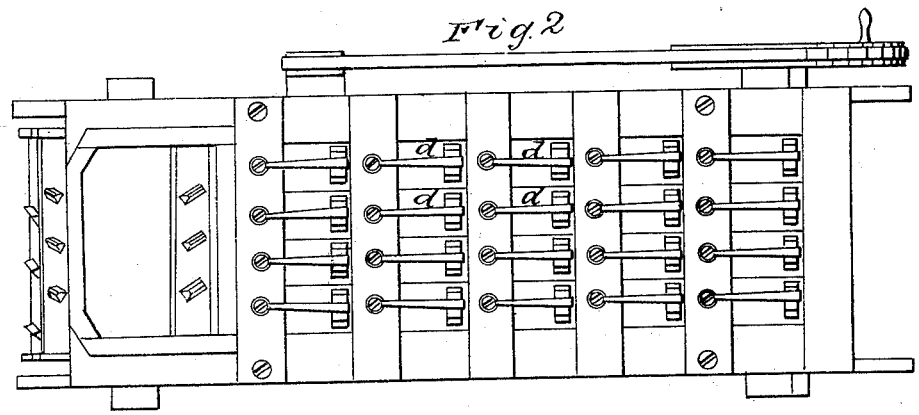
Witnesses
C. N. Alexander
Charles Alexander
R. R. Thom
Inventors
C. Robbins
R. P. Burlingame

UNITED STATES PATENT OFFICE.

CHANDLER ROBBINS AND RUFUS P. BURLINGAME, OF CHICAGO, ILLINOIS.

IMPROVEMENT IN CORN-SHELLERS.

Specification forming part of Letters Patent No. 34,846, dated April 1, 1862.

*To all whom it may concern:*

Be it known that we, CHANDLER ROBBINS and RUFUS P. BURLINGAME, of Chicago, in the State of Illinois, have invented certain new and useful Improvements in Corn-Shellers; and we do hereby declare that the following is a full, clear, and exact description of the same, reference being had to the accompanying drawings and to the letters of reference marked thereon.

In the annexed drawings, making part of this specification, A represents the frame of the machine, which is constructed in a strong and substantial manner. At each end and across this frame are secured two rollers B B, which revolve upon suitable journals having boxes in the frame. Around the rollers B B passes an endless belt C, and upon this belt and crosswise of it a series of metallic plates are secured, which plates are provided with teeth, which are made about three-eighths of an inch high and one inch long. The plates do not exceed two inches in width. The space in the frame between the rollers B B is filled with smaller rollers D D'D, similarly arranged and so situated that the under side of the upper portion of the belt C will rest upon them as said belt revolves.

Situated above the belt are a series of cross-bars *a a*, to the under side of which are hinged a series of toothed plates I I I.

*d d d* are a series of springs, which are secured at one end to the bars *a a* and at their other ends to the plates I I I at their lower ends, for the purpose of keeping the said plates down in proper position to press upon the ears of corn as they pass through.

The corn to be shelled is placed in the hopper H and the endless belt C is set in motion by any suitable machinery. The ears of corn pass down upon the belt and are carried by it under the yielding plates I I. The action of the teeth upon the plates I I and also upon the belt-plates causes the corn to be easily and speedily removed from the ear. A fan is used, as seen, in connection with this machine, for blowing away dirt, husks, &c. The teeth upon the endless belt should not be placed straight across, but should be angling. The angle of the teeth on the endless belt should be reversed at every eight or ten inches, which will prevent the machine from clogging.

One of the rollers B can be made adjustable, so that the belt may be tightened should it become loose.

What we claim as new is—

1. The use of the endless belt C, constructed and operating in the manner and for the purpose specified.

2. The use of the yielding plates I I, in combination with the endless belt, as and for the purpose herein specified.

In witness that we claim the foregoing we have hereunto set our hands in the presence of witnesses.

CHANDLER ROBBINS.
    RUFUS P. BURLINGAME.

Witnesses:
 JOHN ARMSTRONG,
 O. S. GOSS.